Nov. 15, 1932.                G. GODDU                1,887,712
REEL
Filed June 28, 1927
Fig.1.
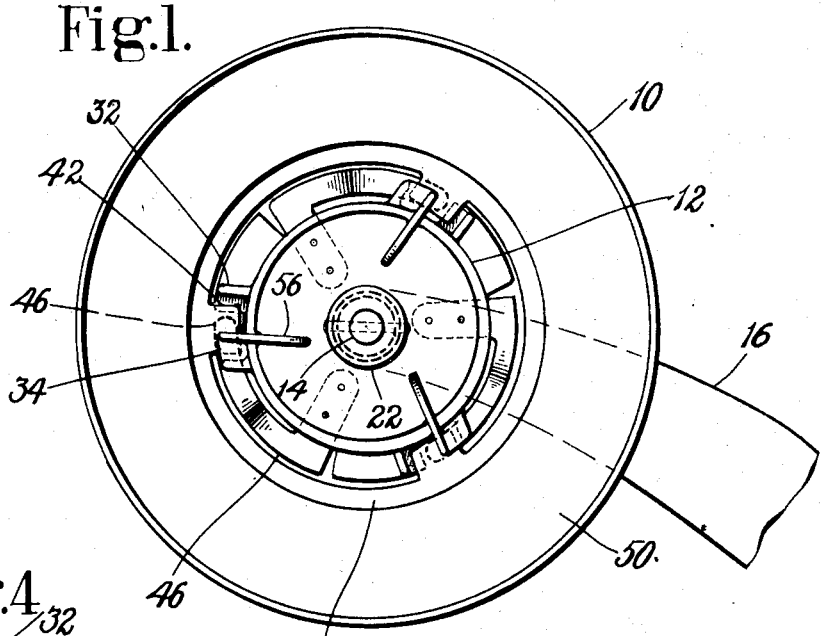
Fig.4.
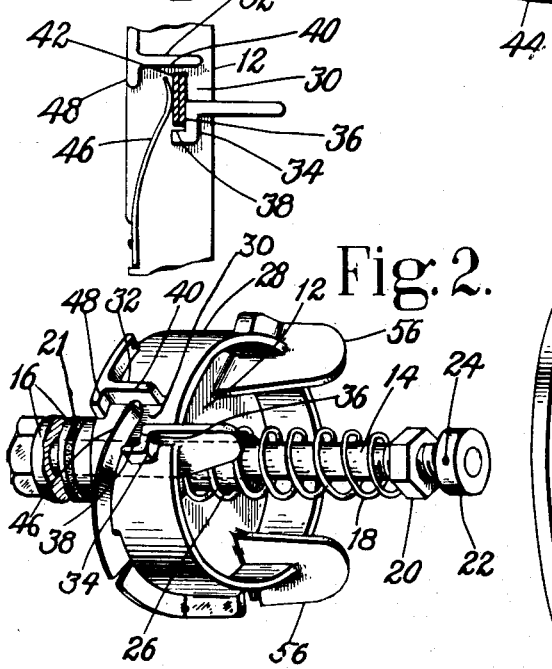
Fig.2.
Fig.3.
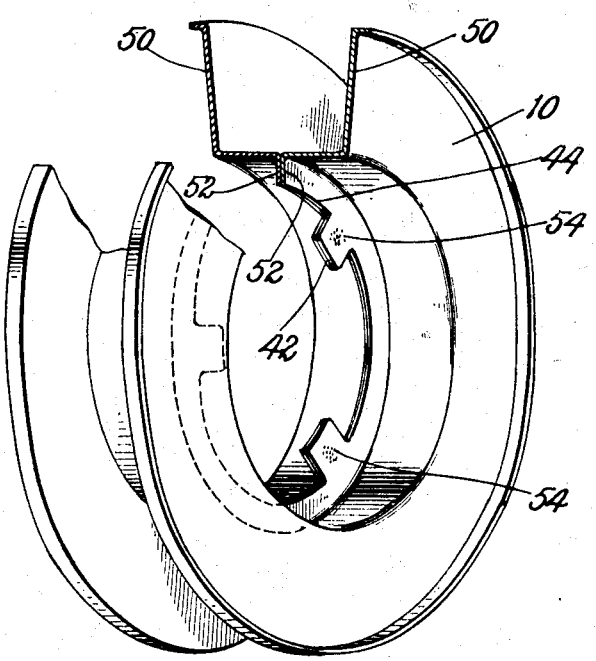
INVENTOR.
George Goddu
By his Attorney,
Nelson W. Howard Patented Nov. 15, 1932

1,887,712

UNITED STATES PATENT OFFICE

GEORGE GODDU, OF WINCHESTER, MASSACHUSETTS, ASSIGNOR TO UNITED SHOE MACHINERY CORPORATION, OF PATERSON, NEW JERSEY, A CORPORATION OF NEW JERSEY

REEL

Application filed June 28, 1927. Serial No. 202,093.

This invention relates to improvements in reels and is illustrated herein as embodied in a reel developed for the purpose of supplying wire to machines which insert fastenings, for example, to such machines as lasting machines of the type disclosed in my application for Letters Patent of the United States, Serial No. 138,300, filed September 28, 1926, now Patent No. 1,796,451. It should be understood, however, that my invention in various of its aspects is not limited in its utility to machines of this type.

Fastening-inserting machines of the types which form the fastenings inserted by the machines from wire, of which machines such as those above referred to furnish an example, are commonly supplied with supports for reels or for coils of wire. It is an object of the present invention to provide an improved reel comprising a light and compact wire-carrying spool detachably connected to a hub which may form a permanent part of the machine. This permits an empty spool to be removed from the hub and a new spool of wire to be applied to the hub without disturbing the adjustment of the friction applied to the hub to control the turning of the reel upon its support and to prevent the reel from overrunning.

The illustrated reel, which constitutes a preferred embodiment of the invention, comprises a hub mounted for rotary movement upon a short shaft carried by the machine and a spool, the hub being provided with a plurality of pockets, each of which consists of a pair of lugs arranged to receive corresponding lugs carried internally by the spool so as to prevent relatively circumferential movement of the spool and the hub and relative axial movement of the spool and the hub in one direction, relative axial movement of the spool and the hub in the opposite direction being prevented by a plurality of springs engaging the lugs of the spool. With this construction, the spool can be readily forced back against the springs when it is to be removed from the hub, and then, when it clears the pockets formed by the lugs of the hub, rotated, and finally moved forwardly away from the springs, and thus completely removed from the machine.

In the drawing,

Fig. 1 is a front elevation of a reel embodying the invention carried by the reel supporting arm of a machine such as that of said application for Letters Patent of the United States, Serial No. 138,300, now Patent No. 1,796,451;

Fig. 2 is a perspective view of the hub of the reel with the spool removed;

Fig. 3 is a perspective view, partly broken away and in cross-section, of the spool of Fig. 1; and Fig. 4 is a diagrammatic view showing the manner in which a lug of the spool is engaged by the hub.

The illustrated reel is made up of a hub 12 and a spool 10 surrounding the hub, the two being detachably connected in such a manner that the spool can be readily removed from and replaced upon the hub. The hub 12 is rotatably mounted upon a short shaft 14 secured to and projecting from an arm 16 carried by the machine to which the reel is applied. A spring 18, bearing at one end upon a nut 20 adjustably threaded upon the shaft 14, and at the other end against the hub 12, presses the hub rearwardly against a washer 21 of leather or other suitable substance surrounding the shaft 14 and bearing against the arm 16. Thus, the braking action caused by the friction can be controlled by adjusting the nut 20 on the shaft 14. To prevent the escape of the nut 20 a collar 22 may be secured to the end of the shaft 14 as by a pin 24. As illustrated, the spring 18 surrounds a collar 26 projecting from and forming a part of the hub 12.

In the illustrated construction the hub 12 is formed with a circumferential flange 28 provided with three external pockets 30 (Fig. 4), each made up of a pair of lugs 32, 34. Each lug 34 is provided with a circumferential surface 36 and a radial surface 38, while each lug 32 is provided with a radial surface 40. Thus, each pair of lugs 32, 34 forms a pocket arranged to receive corresponding lugs 42 projecting from a flange 44 of the spool substantially radially toward the center of the spool, surfaces 38 and 40 restraining the lugs 42 of the spool against circumferential movement relatively to the hub when the spool 10 and the hub 12 have been assembled. Surface 36 prevents axial movement of the spool 10 relatively to the hub 12 toward the right, as viewed in Figs. 2 and 4. To prevent relative axial movement of the spool 10 and the hub 12 in the opposite direction, the hub 12 is provided with a plurality of leaf springs 46 illustrated as riveted to the hub 12, and positioned, as clearly shown in Fig. 4, to bear against the corresponding lugs 42, thus preventing escape of the lugs 42 from the pockets 30. To limit rearward movement (toward the left in Fig. 4) of springs 46 when the reel is pressed in that direction as it is removed from the machine, each lug 32 is provided with a circumferential projection 48 in the path of the corresponding spring 46.

As illustrated, spool 10 is made up of a pair of thin and light circular metal sections 50 (Fig. 3), each approximately L-shaped in cross-section, the two sections 50 having contacting, relatively narrow, circular flanges 52 projecting internally toward the center of the spool and carrying the lugs 42. These L-shaped sections are secured together, in the illustrated spool, by spot welding 54.

To assist in manipulating the hub 12 as a spool 10 is applied to or removed from it, the lugs 34 are extended forwardly to form finger holds 56.

When the spool 10 is to be applied to the hub 12, the spool is moved axially of the hub to bring its lugs 42 into engagement with the median portions of the springs 46. Then the hub is pressed rearwardly (to the left as viewed in Figs. 2 and 4), and is rotated in a clockwise direction as viewed in Fig. 2 until the lugs 42 have been brought into alinement with the pockets 30 formed by the lugs 32 and 34. Then the spool 10 is allowed to move forwardly (to the right in Figs. 2 and 4) under the action of the springs 46 so that the lugs 42 assume the position shown in Fig. 4. When the spool 10 is to be removed, the reverse operation is performed. Since it is not necessary to move the hub 12 or any of the parts which hold the hub upon the machine, the removal or replacement of the spool 10 may be effected without disturbing the friction of the hub.

Having thus described my invention, what I claim as new and desire to secure by Letters Patent of the United States is:

1. A reel comprising a hub mounted for rotary movement, a spool surrounding the hub and detachably secured to the hub and means hold the spool positively against rotary movement relatively to the hub and against movement in one direction axially of the hub and yieldingly against movement in the opposite direction axially of the hub.

2. A reel comprising a hub mounted for rotary movement, and a spool detachably secured to and surrouding the hub, the spool and the hub having inter-engaging portions arranged positively to prevent relative rotary movement of the spool and the hub, and means yieldingly to hold the hub and the spool in assembled condition but arranged to permit manual movement of the spool relatively to the hub, first axially and then circumferentially of the hub, when the spool is to be removed from the hub.

3. A reel for a fastening inserting machine comprising a hub rotatably mounted upon the machine, a spool detachably connected to the hub and provided internally with a plurality of radially extending lugs, a plurality of lugs carried by the hub and arranged to receive the lugs of the spool to prevent relative rotary movement of the spool and the hub and to prevent relative movement of the spool and the hub in one direction axially of the hub, and a plurality of springs secured to the hub, each spring being arranged to engage one of the lugs of the spool to prevent relative movement of the spool and the hub axially in the opposite direction.

4. A reel for a fastening inserting machine comprising a hub rotatably mounted upon the machine, a spool detachably connected to the hub and provided internally with a plurality of lugs, a plurality of pairs of lugs carried by the hub, each pair of lugs being arranged to receive a lug of the spool between the lugs of the pair to prevent relative rotary movement of the spool and the hub, one of the lugs of each pair on the hub being arranged to engage the corresponding lug on the spool in a manner to prevent relative movement of the spool and the hub in one direction axially of the hub, and a plurality of leaf springs secured to the hub, each spring being arranged to engage one of the lugs of the spool to prevent relative axial movement of the spool and the hub in the opposite direction, and to yield under pressure applied through the spool to permit release and replacement of the spool.

5. A reel for a fastening inserting machine comprising a hub mounted for rotary movement upon the machine and a spool surrounding and detachably secured to the hub, the hub and the spool being provided with lugs and pockets arranged for interengagement to prevent relative rotary movement of the spool and the hub and to prevent relative movement of the spool and the hub in one direction axially of the hub, and means yieldingly to hold the lugs in the pockets.

6. A reel for a fastening inserting machine comprising a hub mounted for rotary movement upon the machine and a spool detachably secured to the hub, the hub and the spool being provided one with a group of pockets and the other with a group of radially extending lugs arranged to be received in the pockets, and a plurality of springs arranged yieldingly to hold the lugs in the pockets.

7. A reel for a fastening inserting machine comprising a hub mounted for rotary movement upon the machine, a spool detachably secured to the hub and provided internally with a plurality of lugs, a plurality of external pockets carried by the hub and arranged to receive the lugs of the spool to prevent relative rotary movement of the spool and the hub and to prevent relative movement of the spool and the hub in one direction axially of the hub, and means yieldingly to hold the lugs of the spool in the pockets of the hub.

8. A reel for a fastening inserting machine comprising a hub mounted for rotary movement upon the machine, a spool detachably secured to the hub and provided internally with a plurality of lugs, a plurality of pockets carried by the hub and arranged to receive the lugs of the spool, and a plurality of springs secured to the hub, each spring being arranged to hold one of the lugs of the spool in the corresponding pocket of the hub.

9. A reel for a fastening inserting machine comprising a hub mounted for rotary movement upon the machine, a spool surrounding the hub, and means detachably securing the spool to the hub positively against rotary movement relatively to the hub and against movement in one direction axially of the hub and holding the hub yieldingly against movement in the opposite direction axially of the hub, the connections between the spool and the hub being such that the spool may be removed from the hub without changing the friction of the hub.

10. A reel for fastening inserting machine comprising a hub mounted for rotary movement upon the machine, a sheet metal spool detachably secured to the hub and provided with a plurality of integrally formed lugs, a plurality of external pockets carried by the hub and arranged to receive the lugs of the spool, a plurality of springs secured to the hub, each spring being arranged to hold one of the lugs of the spool in the corresponding pocket of the hub, and a plurality of finger holds formed upon the hub to assist in manipulating the hub as the spool is applied to or removed from the hub.

11. A hub for a reel comprising a circular member having a plurality of pockets on its circumference arranged to receive lugs of a spool to be applied to the reel, the hub also having a plurality of finger holds for use in manipulating the hub as a spool is applied to or removed from it, and means on the hub constructed and arranged to move the lugs into the pockets to prevent relative rotary movement between the hub and the spool.

12. A spool having thin metal side and bottom walls of a general channel-shaped formation to receive wire, and a plurality of radially extending lugs projecting from the bottom wall toward the center of the spool.

13. A spool having thin metal side and bottom walls of a general channel-shaped formation to receive wire, a relatively narrow flange projecting from the bottom of the channel toward the center of the spool, and a plurality of lugs projecting radially from the flange.

14. A spool made up of a pair of thin metal members each approximately L-shaped in cross-section, the two members being secured together to form a channel-shaped wire-receiving receptacle and being provided with a plurality of radially extending lugs projecting toward the center of the spool by which the spool may be secured to a hub.

15. A spool made up of a pair of thin metal members each approximately L-shaped in cross-section, the two members being secured together to form a channel-shaped wire-receiving receptacle, the two L-shaped members having relatively narrow contacting flanges extending from the middle of the channel toward the center of the spool and provided with a plurality of radially extending lugs by which the spool may be secured to a hub.

16. A hub for a reel comprising a circular member having a plurality of pairs of lugs on its circumference, one lug of each pair having a surface extending circumferentially of the hub and a surface extending radially of the hub, and the other lug of each pair having a surface extending radially of the hub and spaced from the corresponding surface of the other lug of the pair.

17. A hub for a reel comprising a circular member having a plurality of pairs of lugs on its circumference, one lug of each pair having a surface extending circumferentially of the hub and a surface extending radially of the hub, and the other lug of each pair having a surface extending radially of the hub and spaced from the corresponding surface of the other lug, and a plurality of springs, one opposed to each of said circumferential surfaces.

In testimony whereof I have signed my name to this specification.

GEORGE GODDU.